US011978943B2

(12) United States Patent
Doty

(10) Patent No.: US 11,978,943 B2
(45) Date of Patent: May 7, 2024

(54) TERAHERTZ WAVEGUIDE COMPRISING AN OUTER COPPER LAYER LAMINATED WITH AN INNER DIELECTRIC LAYER TO FORM A ROLLED GUIDE TUBE WHICH IS ENCASED BY A SUPPORT TUBE

(71) Applicant: Doty Scientific, Inc., Columbia, SC (US)

(72) Inventor: F David Doty, Columbia, SC (US)

(73) Assignee: Doty Scientific, Inc., Columbia, SC (US)

( * ) Notice: Subject to any disclaimer, the term of this patent is extended or adjusted under 35 U.S.C. 154(b) by 0 days.

(21) Appl. No.: 18/259,077

(22) PCT Filed: Feb. 22, 2023

(86) PCT No.: PCT/IB2023/051605
§ 371 (c)(1),
(2) Date: Jun. 28, 2023

(87) PCT Pub. No.: WO2023/161809
PCT Pub. Date: Aug. 31, 2023

(65) Prior Publication Data
US 2023/0402731 A1 Dec. 14, 2023

Related U.S. Application Data

(60) Provisional application No. 63/268,362, filed on Feb. 22, 2022.

(51) Int. Cl.
*H01P 3/12* (2006.01)
*H01P 3/127* (2006.01)
(Continued)

(52) U.S. Cl.
CPC .............. *H01P 3/122* (2013.01); *H01P 3/127* (2013.01); *H01P 3/14* (2013.01); *H01P 3/165* (2013.01);
(Continued)

(58) Field of Classification Search
CPC ............... H01P 3/14; H01P 3/122; H01P 3/12
(Continued)

(56) References Cited

U.S. PATENT DOCUMENTS 4,249,300 A * 2/1981 Sirel ........................ H01P 3/127 156/175
2008/0036558 A1* 2/2008 Suarez-Gartner et al. .................. H01P 3/14 333/239
(Continued)

FOREIGN PATENT DOCUMENTS

KR 20170112901 A 10/2017

OTHER PUBLICATIONS

International Search Report in PCT application No. PCT/IB2023/051605 dated Jun. 22, 2023.
(Continued)

*Primary Examiner* — Benny T Lee
(74) *Attorney, Agent, or Firm* — Oppedahl Patent Law Firm LLC

(57) ABSTRACT

An overmoded dielectric-lined waveguide, particularly for the 0.03 to 3 terahertz frequency range, is disclosed with performance advantages relative to prior dielectric-lined waveguides, cost and size advantages relative to corrugated waveguides, and with coupling, bandwidth, and cost advantages relative to micro-structured-fiber waveguides. The waveguide comprises a single-clad flexible microwave laminate rolled into a cylinder with said copper surface on an outside of said guide tube and said dielectric surface on an
(Continued)

inside of said guide tube. The rolled laminate is supported inside a metal tube. The same method of achieving the structure needed for efficient guiding of $HE_{11}$ mode may be applied to a conical tube to make a low-cost efficient overmoded tapered waveguide transition for the 0.03-3 THz range.

19 Claims, 9 Drawing Sheets

(51) Int. Cl.
*H01P 3/14* (2006.01)
*H01P 3/16* (2006.01)
*H01P 11/00* (2006.01)

(52) U.S. Cl.
CPC .......... *H01P 11/002* (2013.01); *H01P 11/006* (2013.01)

(58) Field of Classification Search
USPC .......................................................... 333/239
See application file for complete search history.

(56) References Cited

U.S. PATENT DOCUMENTS

2009/0174499 A1 7/2009 Hiramatsu et al.
2011/0215887 A1 9/2011 Kunes
2014/0368301 A1 12/2014 Herbsommer et al.
2016/0126637 A1 5/2016 Uemichi

OTHER PUBLICATIONS

Written Opinion in PCT application No. PCT/IB2023/051605 dated Jun. 22, 2023.

* cited by examiner

TERAHERTZ WAVEGUIDE COMPRISING AN OUTER COPPER LAYER LAMINATED WITH AN INNER DIELECTRIC LAYER TO FORM A ROLLED GUIDE TUBE WHICH IS ENCASED BY A SUPPORT TUBE

FIELD OF THE INVENTION

This invention is an improved dielectric-lined cylindrical waveguide and method of fabricating such, particularly for the 0.03 to 3 terahertz frequency range, that has substantial cost and size advantages relative to corrugated waveguides, performance advantages relative to prior dielectric-lined waveguides, and coupling, bandwidth, and cost advantages relative to micro-structured-fiber waveguides.

BACKGROUND OF THE INVENTION

For electromagnetic power transmission in the 2-100 GHz range, simple hollow rectangular or circular fundamental-mode waveguides of high conductivity metals are commonly used. The size of fundamental-mode waveguides decreases linearly with the wavelength, and the attenuation in fundamental-mode waveguides at the normal frequency of use f or $f_0$ of the waveguides is roughly proportional to $f^{3/2}$—about 1.2 dB/m in rectangular WR-28 at 30 GHz, compared to about 25 dB/m in rectangular WR-3 at 250 GHz. The loss for $TE_{11}$ mode in circular fundamental-mode waveguide is somewhat better, but still one typically sees attenuation of ~16 dB/m in 1-mm round copper waveguide at 300 GHz. Hence, fundamental-mode hollow-core waveguides are too lossy for most purposes above 50-200 GHz, depending on the application.

Corrugated overmoded waveguides (OMWGs) operating far above the lowest mode have been commonly used for microwave power transmission in the 30-600 GHz range for half a century when very low loss is needed. For example, measured loss for $HE_{11}$ mode at 250 GHz for a brass corrugated waveguide with inside radius a=9.5 mm was 0.05 dB/m (calculated loss was lower) [Nanni, 2012]. Calculated loss for a corrugated brass OMWG with a=4 mm at 330 GHz is only 0.13 dB/m. A problem with corrugated OMWGs is that they become quite costly to manufacture as the frequency increases and as the diameter is reduced. Moreover, the loss is approximately inverse with $a^3$, and it becomes comparable to that of $TE_{11}$ in a smooth fundamental-mode waveguide when a is ~λ/2, where λ is the free-space wavelength at f. The minimum reported inner diameter ("ID") for a corrugated waveguide above 250 GHz appears to be 7.6 mm [Purea, 2019], which leads to a minimum practical OD of ~9 mm.

Naturally, many alternatives to the above three classic waveguides (fundamental-mode rectangular, smooth round fundamental-mode, and corrugated OMWGs) for the 100-1500 GHz range have been reported and used over the past few decades with advantages in one respect or another for certain applications. However, no alternative has emerged as a clear winner for a wide range of applications for the 0.1-1 THz range, as all of these waveguides have significant limitations with respect to coupling efficiency, cost, stability, size, or loss. The inventors note that many authors have quantified loss per length in np/cm, which is often denoted simply by $cm^{-1}$, and usually called "absorption coefficient", though sometimes called "absorption factor" or "extinction coefficient". The inventors denote loss in dB/m, which is 869 times the loss in $cm^{-1}$.

The specific initial motivation for this invention was for microwave power transmission (generally in the 200-600 GHz range) into probeheads used in NMR Magic Angle Spinning (MAS) Dynamic Nuclear Polarization (DNP), as, for example, in U.S. Pat. No. 10,120,044, issued to Bruker. Generally, the microwave source has been a gyrotron several meters away from the NMR magnet with a corrugated waveguide of ~8-19 mm diameter carrying the beam to the base of the probe. Thus far, such probes have utilized wide-bore magnets, but there is motivation to make MAS-DNP possible in narrow-bore magnets, where space is very limited and a smaller waveguide is essential. The waveguide in the MAS-DNP probe does not need to have extremely low loss as the full length is generally under 0.5 m, but total loss above ~3 dB would impose a substantial cost penalty by requiring a significantly larger gyrotron or other microwave source.

There is strong motivation to be able to perform MAS-DNP using a low-power solid-state source rather than a gyrotron, as that would permit substantial reduction in system cost. Achieving that objective appears possible if sufficient advances can be made in various aspects of the microwave source and probe system. One of the challenges is that a solid-state source begins from a fundamental-mode component followed by an uptaper to a lower-loss waveguide. A downtaper would then usually be needed somewhere between the uptaper and the sample. With prior-art waveguides, it is extremely difficult to insure that a problematic absorptive resonance and mode conversion does not occur within the needed transmission band in transmission paths that include uptapers and downtapers, as illustrated later in one of the figures. The instant invention eliminates that problem.

The classic smooth cylindrical OMWG theoretically permits low loss and acceptable coupling to Gaussian beams. For example, the loss for $TE_{11}$ in a smooth copper waveguide with a=3 mm at 330 GHz is theoretically only 1.5 dB/m at room temperature (and less at low temperatures). In practice, however, the broadband transmission spectrum always shows a large number of closely spaced absorptive resonant spikes as the waveguide length increases much beyond ~50λ, and the diameter increases much beyond ~2λ, arising from mode conversions that arise from minute imperfections in the waveguide interior surface, junctions, and beam alignment [Doty, 2021]. Thus far, all MAS-DNP probes have utilized corrugated OMWGs, primarily to avoid the above-mentioned mode conversion problems seen with smooth waveguides.

Prior-art Terahertz Waveguides. Various micro-structured-fiber sub-lambda waveguides (core diameter $d_{co}$<λ) with lower loss/m than fundamental-mode waveguide have been demonstrated, as reviewed by Barh et al [Barh, 2016], but still, losses have often been in the range of 14-25 dB/m at 400 GHz. Moreover, coupling from a corrugated OMWG into a sub-lambda fiber waveguide typically results in ~6 dB of loss, and coupling from a fiber waveguide to the MAS sample in the NMR probehead would likely result in that much loss again. Equally problematic with low-loss sub-lambda THz fiber waveguides (whether micro-structured or not) is that they are generally not shielded, which leads to losses at their physical supports points, whether the supports are metal or dielectric. Such physical supports are required for small fibers about every centimeter, as it is generally not possible to maintain the fiber under tension without seriously compromising coupling losses.

Step-index fibers based on total internal reflection, where the cladding has lower index of refraction $n_{cl}$ than that of the core, $n_{co}$, have been widely used in applications from near infrared ("NIR") to UV for many decades. An example optical fiber with quartz core and multilayer plastic-cladding for the visible range is disclosed by Yamamoto et al. in U.S. Pat. No. 6,222,972. While the absorption coefficient of quartz is very low below 50 GHz ($\lambda$>6 mm) and above 150 THz ($\lambda$<2 μm), quartz is not a very-low-loss material in the 0.15-5 THz range. For example, the loss tangent for quartz is 0.004 at 400 GHz.

The lowest-loss solid materials for the 0.1-1 THz range are sapphire, HDPE, some grades of PTFE, polyethylene (PE), and polypropylene (PP), and possibly a cyclic olefin copolymer (such as TOPAS) and polymethylpentene (TPX). Sapphire is too brittle for use in a fiber. HDPE and the best grades of PTFE have loss tangent below 0.0006 at 300 GHz, which still implies over 20 dB/m loss in solid-core step-index fibers using these materials at 300 GHz.

Harrington et al, in U.S. Pat. Nos. 5,440,664, 5,567,471, and 5,815,627, disclose the benefit of adding a thin dielectric coating, or lining, to the inside of a small smooth cylindrical waveguide to improve the ability of the waveguide to guide $HE_{11}$ mode with low loss. The applications in these patents were directed at the IR range, particularly wavelengths in the 2-20 μm range. Typically, the inside of a small flexible silica tube is coated with silver by precipitating from a solution, and then a dielectric coating, typically AgI for IR cases, is deposited from a solution, typically under a few microns thick. With careful control of the dielectric coating thickness it is possible to guide $HE_{11}$ IR beams with low loss and low mode mixing. In U.S. Pat. No. 7,315,575 Harrington et al. disclose how multiple thin dielectric coatings, typically under 300 nm, of CdS and PbS, may be applied using wet chemistry to make waveguides with excellent performance for $\lambda$=1.55 μm and for $\lambda$=10.6 μm. Loss as low as 0.06 dB/m was obtained for $\lambda$=1.55 μm.

Several groups have demonstrated excellent low-loss results (1-2 dB/m) for dielectric-lined cylindrical waveguides of 2-4 mm ID for the 1-3 THz range (0.3-0.1 mm) [Harrington, 2011] by a similar process. A thin polystyrene dielectric coating (10-30 μm thick) was able to be applied to the metallized inside surface of the tube with sufficient uniformity by growth from a solution. However, attempts at lower frequencies have not seen practical success, primarily because of difficulties in depositing a uniform low-loss dielectric lining of sufficient thickness inside the waveguide, but also because of approximations in the theory that led to incorrect recommendations on the optimum dielectric thickness. The various prior-art equations have recommended lining thickness generally in the range $\lambda_d/8$ to $\lambda_d/5$, where $\lambda_d$ is the wavelength at $f_o$ in the lining.

Doradla et al. [Doradla, 2012] calculate the optimum thickness for a polystyrene coating at 1.4 THz (0.215 mm) to be ~27 μm, or $\lambda_d/5$, assuming its dielectric constant is 2.58. Doradla et al. report experimental loss of 2 dB/m for an Ag waveguide of 2.1-mm ID with PS coating ~27 μm thick. Here, the waveguide ID was ~10$\lambda$.

Han, in U.S. Pat. No. 7,106,933 and in U.S. Pat. No. 8,009,952, and Siegel et al. in U.S. Pat. No. 7,315,678, disclose various designs for photonic band gap (PBG) waveguides for the 100 GHz to 30 THz range based on honeycomb structures of sub-lambda tubes that guide the wave through the hollow (or mostly hollow) core in the center of the honeycomb structure. Such waveguides can in principle achieve low loss by keeping nearly all of the propagating wave in the central air. However, manufacture is not easy nor is it generally easy to couple efficiently into and out of the waveguides, and the overall diameter required for the 300-600 GHz range is quite large. Moreover, performance is generally well below theoretical expectations because of positioning imperfections and the distortions or other effects resulting from the bonding of the tubes, irrespective of the bonding means chosen. The above patents do not report expected theoretical, simulation, or experimental losses. Related PBG waveguides have also been used in the NIR range, as seen in U.S. Pat. No. 9,335,466 by Spencer.

Sun et al. in U.S. Pat. No. 7,409,132, disclose a sub-lambda plastic waveguide comprising a solid plastic core such as PE with index of refraction $n_{co}$ that is greater than the index of refraction of the cladding $n_{cl}$, as in the conventional step-index waveguide of U.S. Pat. No. 6,222,972, except now with core diameter $d_{co}<\lambda$, and preferably less than $\lambda/3$. Moderately low loss/m was expected for $HE_{11}$ mode with $d_{co}\sim\lambda/4$, as most of the wave should be in the air outside the thin cladding surrounding the core. The problem with this and other low-loss sub-lambda plastic waveguides is that such waveguides are not shielded, leading to high losses at physical support points for the waveguides, as noted earlier. The reported attenuation factor was ~0.04 $cm^{-1}$ at 300 GHz for a 0.1 mm PE fiber. That is equivalent to −35 dB/m, which is much worse than what is expected from classic fundamental-mode round hollow-metal waveguide. The reported coupling efficiency was −8 dB.

Henry et al. in U.S. Pat. No. 10,965,344 (and in the divisional patents depending therefrom) show in FIG. 18A an HDPE-core fiber (permittivity s=2.3 at 300 GHz) with thick expanded polyethylene foam cladding (EPE, $\varepsilon$ in the 1.2-1.4 range) which makes a very good waveguide for the range of primary interest, 3-65 GHz. FIG. 19L of the same patent shows the use of sections of splined foam extrusions to center a coaxial conductor inside a shield. Tuunanen et al. in U.S. Pat. No. 6,130,385 illustrate several prior-art examples of the use of structured solid polymer and inventive low-loss polyethylene-blend foams to center a coaxial conductor inside a shield conductor, particularly for frequencies up to 3 GHz.

Two other waveguide designs have demonstrated very low loss in the 200-800 GHz range: the parallel-plate waveguide, as disclosed in U.S. Pat. No. 8,259,022, and the gap-mode waveguide as disclosed in U.S. Pat. No. 8,952,678, but these waveguides have significant coupling and size disadvantages compared to corrugated OMWGs.

A number of groups have used rectangular waveguides with quartz sheets ($\varepsilon$=3.9 in the 0.2-1 THz range) on the wider inner surfaces for the generation of coherent Cherenkov radiation (CCR) in the 0.1-1 THz range from sub-picosecond electron bunches and for electron beam deflection and manipulation using microwave beams in the 0.1-1 THz range. These waveguides have been called "dielectric-lined waveguides", though they are actually only partially lined with two quartz sheets, which has elastic modulus ~70 GPa and thus is not flexible. Pacey et al. [Pacey, 2019] show the use of a 2-mm-wide rectangular waveguide with sheets of 0.025-mm thick fused silica lining top and bottom surfaces and an air gap between the sheets in the 0.15-1.1 mm range. Healy et al. [Healy 2016] show the use of quartz sheets of 0.03 mm thickness at typical $f_o$=784 GHz, which corresponds to a slab thickness of ~0.15$\lambda_d$, where $\lambda_d$ is the wavelength at $f_o$ in quartz. Georgiadis et al. [Georgiadis, 2021] show the use of a 1-mm-wide rectangular waveguide, with sheets of 0.24-mm thick fused silica lining top and bottom surfaces to reduce dispersion in microwave beams in the 0.1-0.6 THz range, which is used to deflect energetic electron bunches.

Nanni et al. [Nanni, 2015] describe the use of a dielectric loaded cylindrical waveguide comprising a quartz capillary of 0.4-mm ID and 0.94-mm OD inside a copper tube of 0.94-mm ID for accelerating electron beams in a LINAC driven by a 450-GHz microwave beam. Note that here the 0.27-mm dielectric wall corresponds to ~$0.81\lambda_d$. Lemery calculates Green's functions and fields for a dielectric lined cylindrical waveguide as a Wakefield accelerator at ~270 GHz with copper tube ID of 0.9 mm and diamond dielectric ID of 0.8 mm, in which case the diamond dielectric lining thickness would be ~$0.11\lambda_d$, as its $\varepsilon$=5.7.

SUMMARY OF THE INVENTION

An overmoded dielectric-lined waveguide, particularly for the 0.03 to 3 terahertz frequency range, is disclosed with performance advantages relative to prior dielectric-lined waveguides, cost and size advantages relative to corrugated waveguides, and with coupling, bandwidth, and cost advantages relative to micro-structured-fiber waveguides. The waveguide comprises a single-clad flexible microwave laminate rolled into a cylinder with a copper surface on an outside of the guide tube and a dielectric surface on an inside of the guide tube. The rolled laminate is supported inside a metal tube. The same method of achieving the structure needed for efficient guiding of $HE_{11}$ mode may be applied to a conical tube to make a low-cost efficient overmoded tapered waveguide transition for the 0.03-3 THz range.

DETAILED DESCRIPTION OF EXEMPLARY EMBODIMENTS

Figure 1:
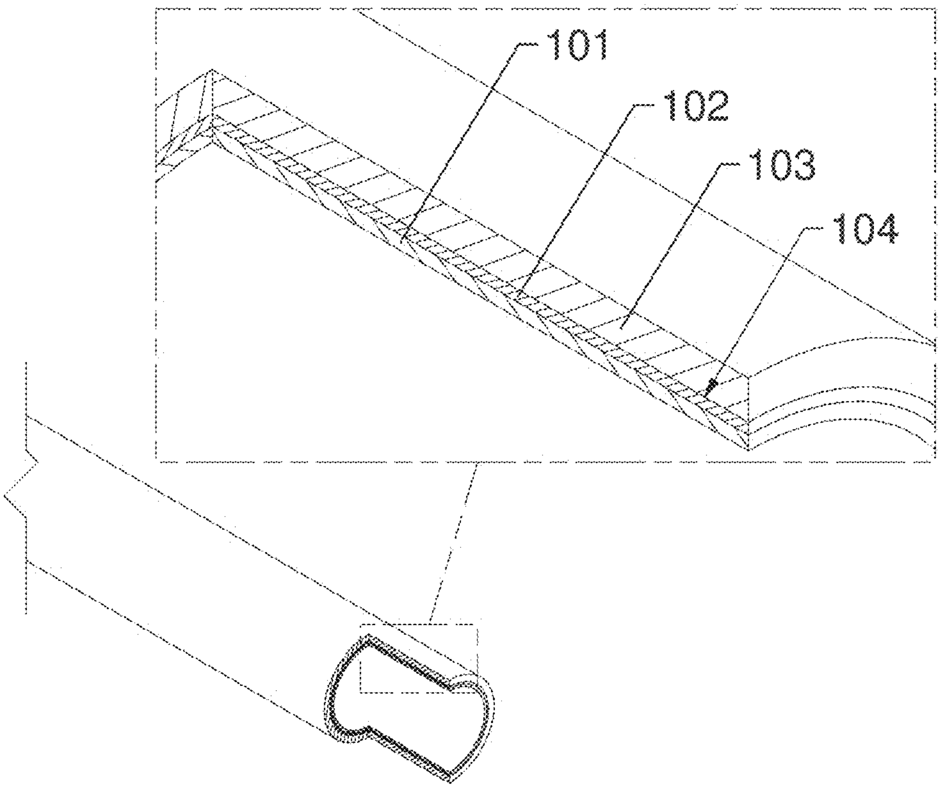
FIG. 1 is a cross-section view of the rolled-laminate waveguide.

FIG. 1 is a cross-section view of the rolled-laminate waveguide, or alternatively identified as a laminate-lined waveguide. In this figure are shown the laminate dielectric layer 101, the laminate copper layer 102, and the support tube 103. The copper layer 102 is shown with exaggerated relative thickness for better clarity. The rolled single-clad laminate strip would normally be a snug fit inside the support tube, with its two longitudinal sides abutting along edge 104. However, a small and irregular gap may be present where the two sides meet without significant adverse effect on performance.

The laminate layers 101, 102 forms the guide tube and could be any of the commonly available low-loss flexible microwave copper-clad laminates, in which the dielectric is substantially PTFE, possibly with some glass or ceramic reinforcing fibers. Examples of suitable laminate product lines include Polyflon CUFLON (a microwave substrate comprising PTFE coupled with a plating process), Rogers DUROID (a filled PTFE), and Taconic TLY5 (a composite of PTFE with a lightweight woven fiberglass). Various grades of these materials have dielectric constants (permittivity) below 3 with loss tangent below 0.003 at 30 GHz, and some (at least those with pure PTFE dielectric) have loss tangent below 0.002 at 400 GHz. These laminates are available in various dielectric thicknesses, in some cases down to 0.025 mm, and even thinner dielectric may be possible for pure PTFE. In principle, other low-loss flexible dielectrics such as HDPE, TPX, and TOPAS (a cyclic olefin copolymer) could also be used, but copper-clad laminates utilizing such are not commercially available.

The laminates are normally supplied with copper cladding on both surfaces, in which case the copper cladding would need to be etched from one side to obtain the needed single-clad laminate. The copper claddings are typically 11-70 μm thick (0.33 oz/ft$^2$ to 2 oz/ft$^2$), any of which is suitable, as i the thickness need only be more than 4δ, where δ is the rf skin depth, ~0.4 μm in copper at 30 GHz. Preferably the dielectric substrate should have elastic modulus less than 100 times its tensile strength to have the flexibility needed to be readily formed into a cylinder of sufficiently small diameter when single-clad.

Figure 2:
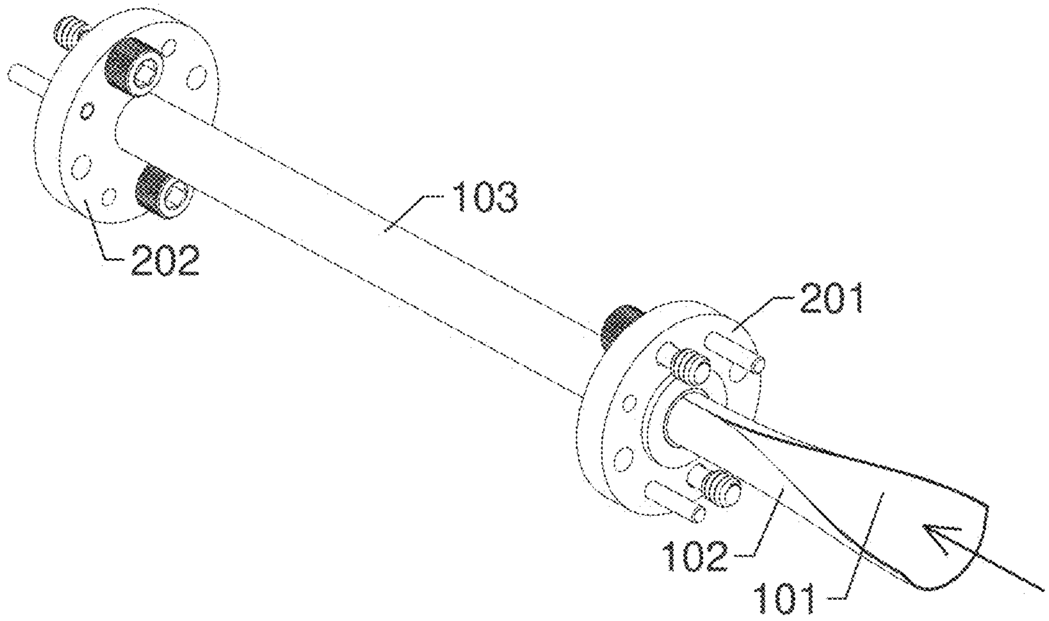
FIG. 2 is a perspective view illustrating insertion of a rolled laminate strip into a support tube.

The support tube 103 would typically be either soft copper or a hard copper alloy, depending on whether or not some flexibility was desired. Either material readily permits soldering to connector flanges 201, 202 which may be desired at the ends, as illustrated in FIG. 2. FIG. 2 also shows the laminate dielectric layer 101, the laminate copper layer 102, and the support tube 103. In either case, however, the flexibility of the waveguide would be quite limited, as the stresses developed in the laminate's copper cladding could cause the laminate to tear or wrinkle for a waveguide axis bend radius of less than ~50 $d_i$, where $d_i$ is the inside diameter of the waveguide.

The alert reader immediately sees the similarity between the instant invention and the coated hollow flexible waveguides by Harrington et al., but there are a number of crucial inventive differences that substantially improve RF performance at frequencies to at least 2.5 THz with available microwave laminates. As noted earlier, the prior-art polystyrene solution precipitation method has not permitted deposition of coatings of the thickness and quality needed for satisfactory waveguide performance below ~1 THz. Moreover, the loss tangent of PS is typically 5 to 20 times that of PTFE in the 0.1 to 3 THz range, depending on impurities and polymerization details.

The more obvious alternative to the instant invention of simply forming an un-clad dielectric sheet into a cylinder and inserting that into a metal tube results in a variable air gap layer between the dielectric and the metal tube that leads to extremely high E fields in the dielectric and extremely high H fields on the surface of the metal tube at all the micro contact points between the dielectric lining and the metal tube. The surface currents in the metal are the dominant loss mechanism in all the simulated cases reported herein. Those losses are quadratic with H field and thus are much greater when the H surface field is less uniform. The instant invention eliminates virtually all of those high-loss contact points (other than the few that remain at the edges of the copper-clad laminate) and thus greatly reduces losses and mode conversions that surface irregularities can cause.

Simulations using state-of-the-art highly validated commercial microwave software (in particular, the time-domain software CST, currently available from Dassault Systemes) show that the optimum lining thickness $t_d$, at least for waveguide diameters in the range of 3-10λ, is ~$\lambda_d/4$, where $\lambda_d$ is the wavelength at $f_o$ in the lining, though excellent performance is also often seen with $t_d$ as small as $\lambda_d/6$ or as large as $\lambda_d/3$.

Figure 3:
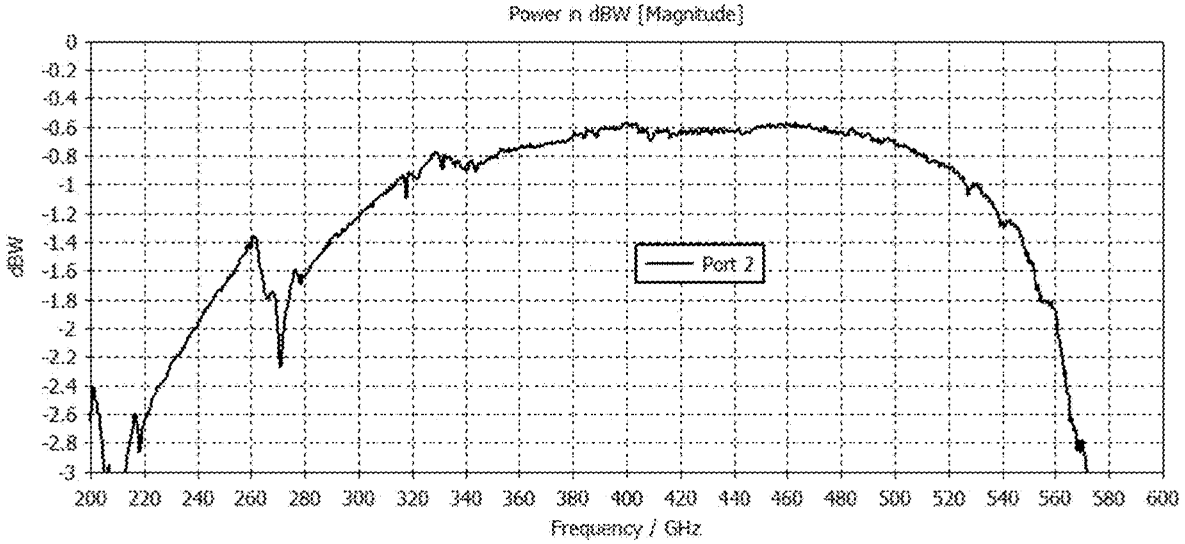
FIG. 3 shows simulated power loss for an exemplary rolled PTFE-laminate waveguide for a case where the ID is ~6.6λ at 410 GHz, the laminate dielectric thickness is $\lambda_d/4$, and the waveguide length is 0.5 m (684λ).

FIG. 3 shows simulated power loss (effective composite S21) for the case of a waveguide of 4.8-mm ID made using PTFE laminate with dielectric thickness 0.127 mm (0.005 inches, a standard size), corresponding to $\lambda_d/4$ at 410 GHz for ε=2.08 (λ=0.73 mm at 410 GHz). The dielectric loss tangent in the simulation was 0.001 (probably a little high for high-grade PTFE at ~400 GHz), and the copper conductivity was set at $3\times10^7$ S/m to realistically account for the effects of surface roughness. Here, the waveguide length was 500 mm (684λ), and the waveguide was excited with a 1 W quasi-Gaussian microwave beam that was a close approximation of the hybrid mode $HE_{11}$. Small defects, in the form of 0.02-mm metal protrusions into the waveguide at four places along the length, were included in the numerical model as proxies for typical manufacturing defects. The left scale (vertical axis) shows the magnitude of the power in dBW accepted at the Port 2 (sum of all modes, mostly $TE_{11}$ and $TM_{11}$). The horizontal axis shows frequency of RF in gigahertz. The loss in dB/m would be about twice the numbers shown on the vertical scale, as input and output coupling losses were each only ~2%. The mid-range loss is seen to be ~1.2 dB/m.

Note that the loss for $HE_{11}$ for the above case (with about an octave usable range) is over two orders of magnitude smaller than the 25 dB/m expected in fundamental-mode round waveguide at 400 GHz. The dielectric thickness in the case of FIG. 3 would be ~$\lambda_d/6$ at 270 GHz, and at 540 GHz the dielectric thickness is ~$\lambda_d/3$. Several other simulations indicated that the loss scales approximately with $1/d_i^2$ for guide-tube ID $d_i$ in the range 3-9λ. Losses increase more rapidly at diameters below 3λ, but some benefit from dielectric lining relative to unlined may be seen at diameters down to 2λ in some cases. Losses continue to decrease as $d_i$ increases beyond 10λ, though less predictably. Diameters up to 20λ may be useful in cases where external dimensions are not constrained and where extremely low loss over long transmission paths is desired. The exceptionally broad and flat transmission spectrum from 320 GHz to 520 GHz implies the low dispersion needed for minimal distortion of pulse shape of sub-nanosecond pulses over this range.

In another simulation, the same waveguide as simulated for FIG. 3 was excited with the $TE_{11}$ mode, and the mid-range loss was seen to be about twice what was seen for the $HE_{11}$ mode. The bandwidth was about 10% less and shifted higher by ~10%.

Figure 4:
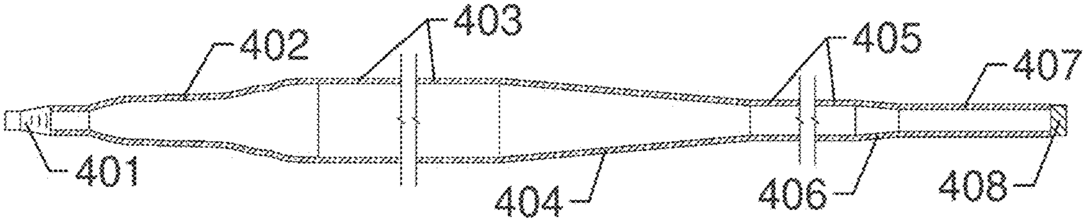
FIG. 4 illustrates in cross section a shortened version (for better visual clarity) of an example application for delivering THz power from a fundamental-mode source to a remote small sample with low loss and high intensity.

FIG. 4 illustrates in cross section a shortened version (for better visual clarity) of an example application for delivering THz power from a $TE_{11}$ fundamental-mode source to a remote small sample with low loss and high final intensity. In the exemplary case simulated here, producing the results shown in the two subsequent figures, the design frequency is 345 GHz (λ=0.87 mm), the diameter of the sample needing high intensity irradiation is assumed to be ~2 mm, and the sample is located ~0.4 m from the source. The example also demonstrates low loss when there are external constraints that require the use of smaller waveguides near the sample.

The $TE_{11}$ mode THz source 401 excites the short fundamental-mode cylindrical waveguide on the left. Since loss for $HE_{11}$ mode in lined waveguides is about half of that for $TE_{11}$ mode and loss is lower in waveguides of larger diameter, the first step is to convert the $TE_{11}$ mode to $HE_{11}$ mode of substantially larger diameter with a quasi-Gaussian profile. This is done in spline horn 402, according to the prior art, which converts some of the input $TE_{11}$ mode to the needed $TM_{11}$ mode component of appropriate relative amplitude and phase. For the exemplary case simulated here, a published 33-45 GHz spline horn optimization [Zeng, et al., 2010] was scaled down by a factor of ~10 for 300-400 GHz operation, with relative dimensions approximately as shown. The spline horn is followed by a large overmoded cylindrical waveguide 403, of ID matching the aperture of the spline horn, that guides the beam over most of the path length in the example cases simulated.

A first conical down-taper transition 404 then reduces the beam diameter to match the diameter of mid-sized overmoded cylindrical waveguide 405, which guides the beam at higher intensity over most of the remaining path. A second conical down-taper transition 406 then reduces the beam diameter to match the diameter of small overmoded cylindrical waveguide 407, which guides the beam at yet higher intensity over the remaining distance to the sample 408. Small defects, in the form of 0.2-mm edge radii on the components at the junctions and 0.07 mm gaps extending radially 0.3 mm into the metal wall and 0.1 mm misalignments, were included in the numerical model at the junctions between each component to approximate what might be seen from typical manufacturing and assembly errors.

Figure 5:
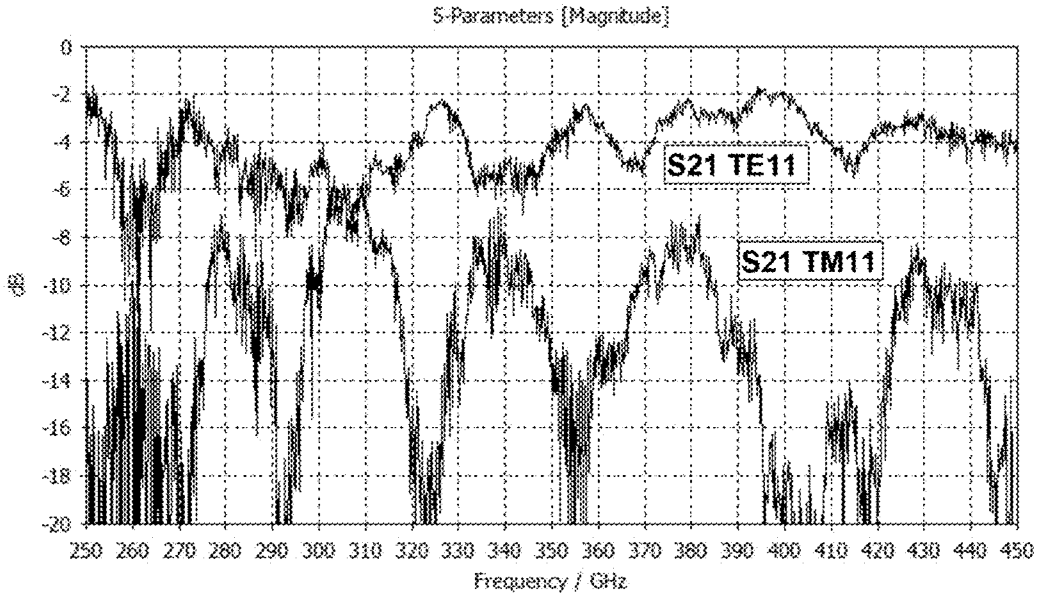
FIG. 5 shows simulated transmission spectra for a case similar to FIG. 4 with classic smooth waveguides and transitions.

Simulated transmission spectra for the above described 345-GHz case with classic smooth hollow metal waveguides and transitions are shown in FIG. 5 for the case where the input is excited by a 0.5 W $TE_{11}$ mode, further described as follows. The left scale (vertical axis) shows the magnitude of the S-parameter (i.e. $S_{21}$) in dB accepted at the output port for the modes shown ($TE_{11}$ and $TM_{11}$). The horizontal axis shows frequency of RF in gigahertz. The large overmoded waveguide is 300 mm long with 4.8 mm ID. The mid-sized waveguide is 100 mm long with 3.9 mm ID. The small waveguide is 10 mm long with 2.9 mm ID. The semi-angle in each of the transitions is 5°. Note that total power loss is ~30% at 345 GHz, and it varies widely with frequency.

Figure 6:
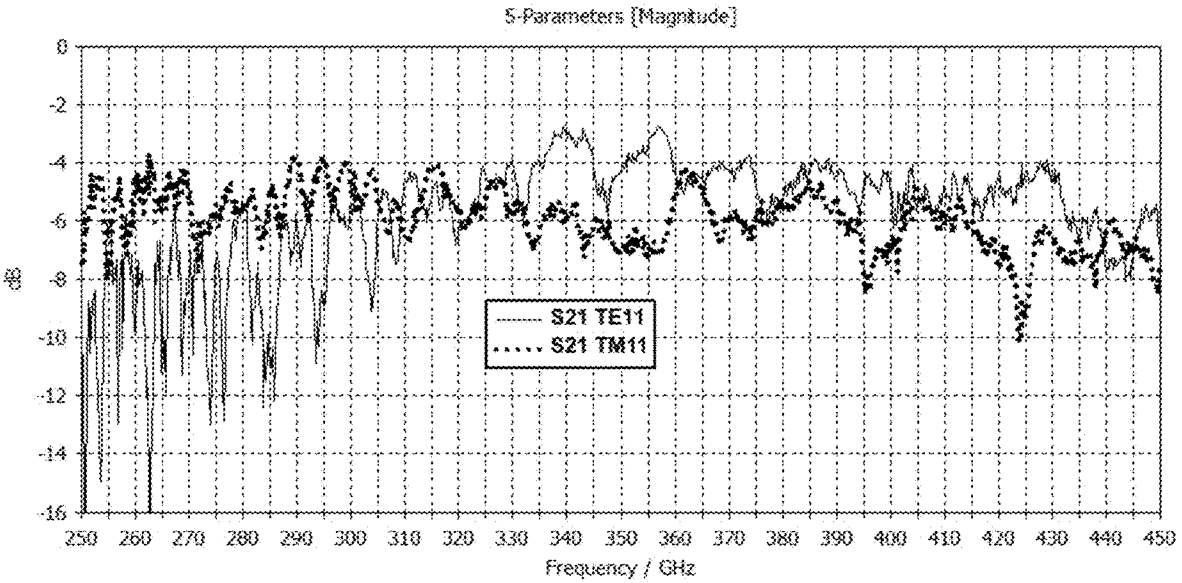
FIG. 6 shows simulated transmission spectra for a case similar to FIG. 4 with rolled-laminate waveguides and transitions.

Simulated transmission spectra for the same case, except now with all the overmoded waveguides and tapered transitions lined with PTFE 0.15 mm thick ($\lambda_d/4$ at 345 GHz), are shown in FIG. 6. The left scale (vertical axis) shows the magnitude of the S-parameter (i.e. $S_{21}$) in dB accepted at the output port for the modes shown ($TE_{11}$ and $TM_{11}$). The horizontal axis shows frequency of RF in gigahertz. The metal ID dimensions are the same for both cases. Note that now total power loss is ~20% at 345 GHz—about half of which was seen to be in the short input fundamental-mode waveguide and the un-lined spline horn—with much lower frequency dependence. The metal IDs for the three lined cylindrical waveguides in terms of λ at 345 GHz are approximately 5.5λ, 4.5λ, and 3.3λ respectively.

Figure 7:
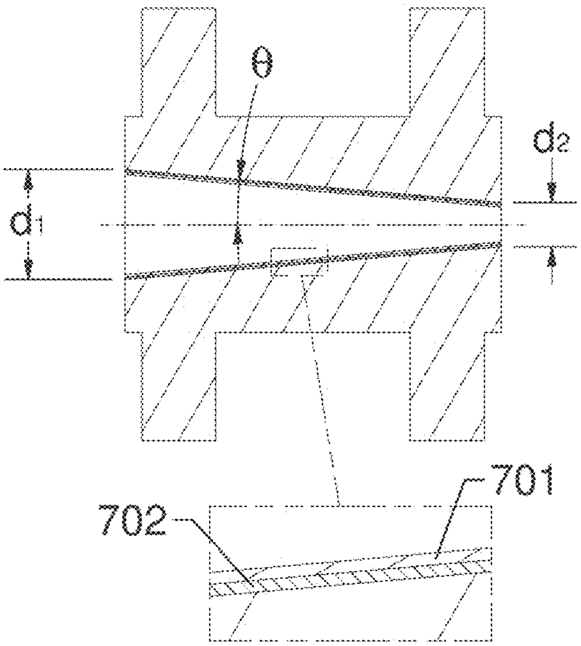
FIG. 7 illustrates in cross section a rolled-laminate tapered conical transition.

The laminate-lined conical tapered transition, as illustrated in FIG. 7, can be seen to be a subset of the general laminate-lined cylindrical waveguide. It is characterized by a conical guide tube made from a flexible laminate to form an inner dielectric layer 701 and a copper layer 702. It is further characterized by a maximum inside diameter $d_1$ at a first end, a minimum inside diameter $d_2$ at a second end, and a taper semi-angle θ of a longitudinal surface line with respect to the axis as shown. The performance of laminate-lined tapers—as assessed by loss and flatness seen in S21 for cases like FIG. 6—changed little for semi-angles up to 6°, but it degraded slowly with increasing angles. Performance also began degrading when the minimum ID of the transition was reduced below half of its maximum ID. When more reduction is needed, better results are generally seen by using a sequence of multiple downtapers with straight sections between them, as shown in FIG. 4.

Figure 8:
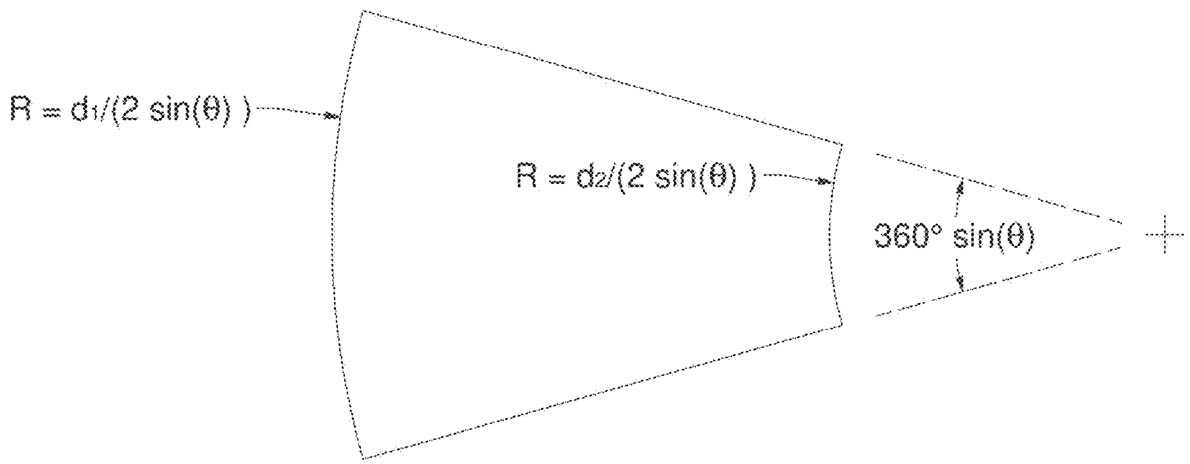
FIG. 8 is a laid-out flat view showing the laminate shape needed to line a conical support tube with a rolled laminate to produce a laminate-lined conical transition.

FIG. 8 is a laid-out flat view showing the laminate shape needed to line a conical support tube with a rolled laminate to produce a laminate-lined conical transition. The laminate sheet can be rolled to form a conical transition guide and inserted into a conical support tube. The figure shows a larger curve at left in FIG. 8 giving rise to a radius $R=d_1/(2\sin(\theta)$, and a smaller curve to the right in FIG. 8 giving rise to a radius $R=d_2/(2\sin(\theta)$. The figure shows the angle at the vertex at right being 360° sin(θ).

A low-loss waveguide optimized for 2 THz (λ=0.15 mm) could be made using the thinnest PTFE-substrate laminate currently commercially available (0.025 mm) inside a support tube of 1 to 2 mm ID. Scaling from the results in FIG. 3, such a waveguide should perform quite well over the range 1.6-3 THz. A thinner PTFE-substrate laminate would permit excellent performance to even higher frequencies.

A low-loss waveguide optimized for 32 GHz (λ=9.4 mm) could be made using a PTFE-substrate laminate with 1.59-mm dielectric thickness (a common commercially available size) inside a support tube as small as 20 mm ID.

Composite substrates with somewhat higher dielectric constants than PTFE are available with loss tangents below 0.003 at 30 GHz and possibly even up to 200 GHz, making such suitable for dielectric linings at frequencies in the 30-200 GHz range. However, they also have substantially lower flexibility, making them more difficult to use for cases with $d_i/t_d<30$, while the pure PTFE substrates can readily be used with $d_i/t_d$ as small as 10, or even as small as 7 with suitable procedures. Forming the laminate into the cylindrical or conical guide tube is generally easier if the copper thickness is greater than $t_d/20$ but less than $t_d/3$.

As the support tube can easily be quite thin, the OD of a 600 GHz laminate-lined waveguide, with $d_i=4\lambda_d$ could be as small as 2.2 mm, which is about a quarter the OD that seems practical for a corrugated waveguide at 600 GHz.

The basic manufacturing concept illustrated previously in FIG. 2 belies some practical manufacturing challenges for small-diameter laminate-lined waveguides, at least above ~100 GHz. Inserting the copper-clad PTFE laminate into the waveguide is not as simple as FIG. 2 would imply. The PTFE must be very thin (0.1 mm for 530 GHz, for example) and the copper cladding is very thin and soft. Keeping the material from wrinkling during its insertion is not trivial. Pre-forming strips of copper-clad PTFE laminate (under heat and pressure) to the needed diameter is the first step. Then with suitable tooling, short pieces of the thin laminate cylinders (guide tubes) can be slid into the support tube without wrinkling. Imperfections at the junctions (end boundaries) between the successively inserted short laminate cylinders are unavoidable, and such may cause reflections. Minimizing the number of such junctions requires using the longest practical piece lengths, which for a given laminate thickness is primarily limited by the coefficient of friction between the copper cladding and the support tube. The alert reader will be aware that the coefficient of friction between unlubricated metals may be reduced—often by about a factor of two—by surface grain size reduction by sanding, particularly on alloys with significant work hardening capability, such as the common 95Cu-5Sn alloy, for example. Hence, insertion of longer laminate pieces into the support tube is facilitated by selecting a work hardenable alloy for the support tube and sanding its inside diameter. As will also be appreciated by the alert reader, the coefficient of friction may be reduced by another factor of 2 to 3 by applying a thin film of a lubricant to one or both of the engaging surfaces. An example of a suitable lubricant is a lightweight polyalphaolefin oil, as it readily forms a very thin film. The effect of the lubricant on the microwave performance of the waveguide is negligible if residual traces of the oil are cleaned from the PTFE surface after assembly.

Figure 9:
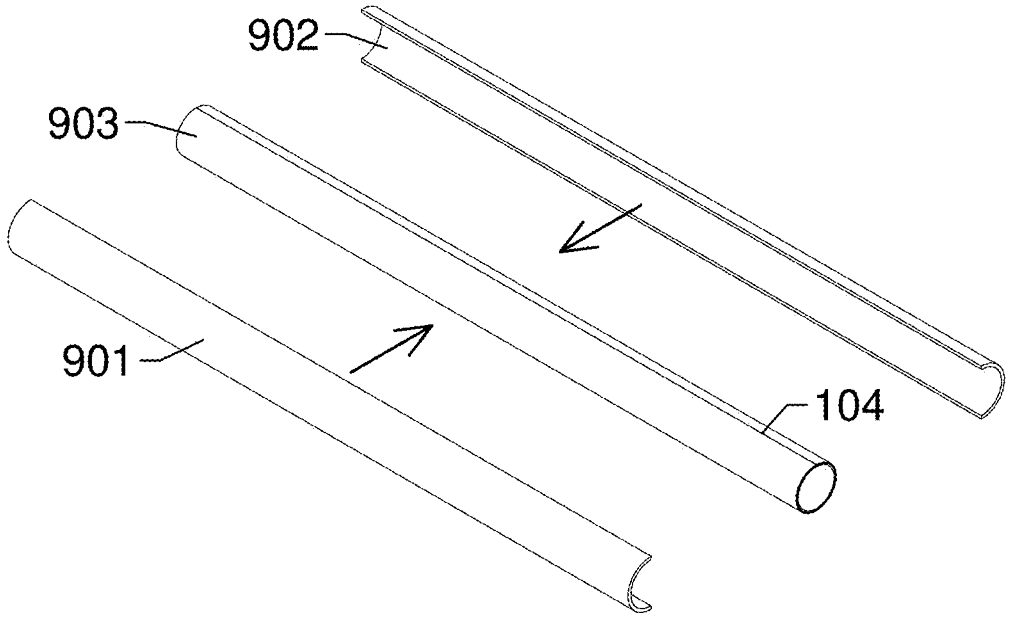
FIG. 9 shows semi-cylinder support tubes with a round outer profile.

A manufacturing alternative is shown in FIG. 9 that may often work better for small waveguide sizes, as may be needed at least above 500 GHz and possibly even down to 70 GHz. Two longitudinally split rigid semi-tubes 901,902 with inner semi-cylindrical surfaces may be brought together over the pre-formed laminate guide tube 903 to encase and support it. Normally, these would be metallic semi-tubes to permit soldering to connector flanges (often called interfaces) at the ends of the waveguide and to prevent radiation loss from the abutting axial edge 104 in the guide tube.

Figure 10:
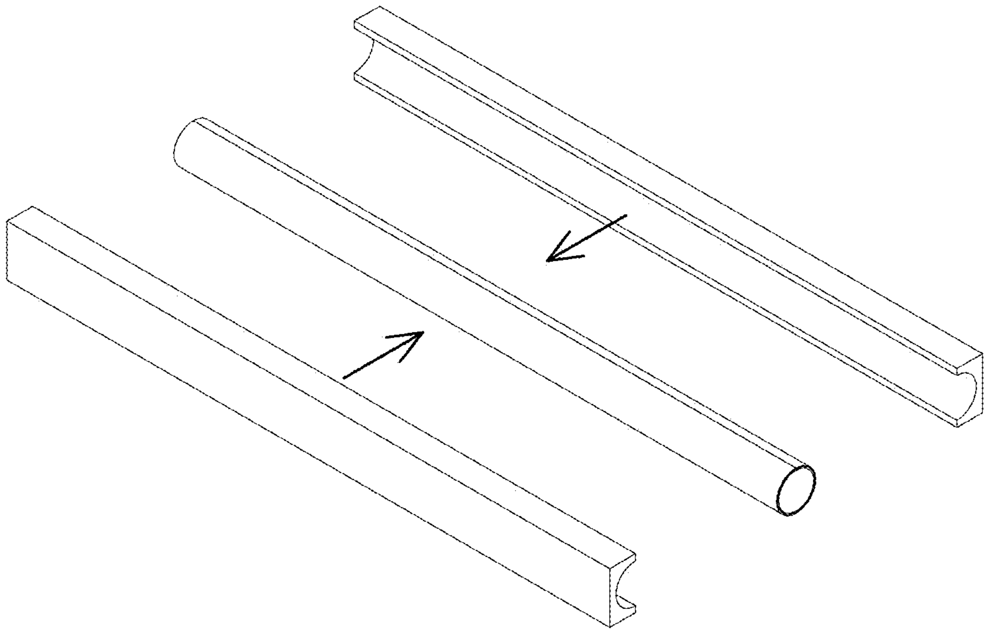
FIG. 10 shows semi-cylinder support tubes with a square outer profile.

The outer surface of the support semi-tubes need not be round. For very small waveguides, it may be preferable to produce the support semi-tubes by milling a concave cylindrical surface onto one side of a rectangular strip, as seen in FIG. 10. As in the previous figure, two of these can be brought together to encase and support the laminate guide tube. In either case, the two semi-tubes would normally be bonded together by a suitable method, which could be soldering, laser welding, or gluing along the axial boundaries between them.

The alert reader will have no difficulty devising myriad obvious improvements and variations to the invention set forth herein, all of which are intended to be encompassed with the claims which follow.

REFERENCES

1. Harrington et al., U.S. Pat. No. 5,440,664, Coherent, Flexible, Coated-bore Hollow-fiber Waveguide, 1995.
2. Harrington et al., U.S. Pat. No. 5,567,471, Coherent, Flexible, Coated-bore Hollow-fiber Waveguide, and Method of Making Same, 1996.
3. Harrington et al., U.S. Pat. No. 5,815,627, Coaxial Hollow Core Waveguide, 1998.
4. Yamamoto et al., U.S. Pat. No. 6,222,972, Wideband plastic-clad optical fiber, 2001.
5. Han, U.S. Pat. No. 7,106,933, Plastic Photonic Crystal Fiber for terahertz wave transmission and method for manufacturing thereof, 2006.
6. Siegel et al., U.S. Pat. No. 7,315,678, Method and Apparatus for Low-loss Signal Transmission, 2008.
7. Sun et al., U.S. Pat. No. 7,409,132, Plastic Waveguide for Terahertz Wave, 2008
8. Harrington et al., U.S. Pat. No. 7,315,575, Method, and Article of the Method, for Fabricating a Flexible, Hollow Waveguide, 2008.
9. Bowden B, Harrington J A, and Mitrofanov O, "Fabrication of terahertz hollow-glass metallic waveguides with inner dielectric coatings,", J Appl. Phys. 104(9), 2008.

10. Zeng L, Bennett C L, Chuss D T, and Wollack E J, "A Low Cross-Polarization Smooth-Walled Horn with Improved Bandwidth", IEEE Trans. Antennas and Propagation, Vol 58, no 4, 1383-1387, 2010. DOI 10.1109/TAP.2010.2041318.
11. Mitrofanov O, James R, Fernandez F A, Mavrogordatos T K, and Harrington J A, "Reducing Transmission Losses in Hollow THz Waveguides", IEEE Trans. Terahertz Sci and Tech., Vol 1, no 1, 2011, DOI 10.1109/TTHZ.2011.2159547
12. Mendis et al., U.S. Pat. No. 8,259,022, Ultra Low Loss Waveguide for Broadband Terahertz Radiation, 2012.
13. Mitrofanov O, Navarro-Cia M, Vitiello M S, Melzer J E, Harrington J A, "Terahertz waveguides with low transmission losses: characterization and applications", Terahertz Emitters, Receivers, and Applications V, Proc. SPIE V 9199, 2014, DOI: 10.1117/12/2062758.
14. Giboney, U.S. Pat. No. 8,952,678, Gap-mode Waveguide, 2015.
15. Nanni E A, Huang W R, Hong K H, et al, "Terahertz-driven linear electron acceleration", Nat. Comm. DOI: 10.1038/ncomms9486, 2015.
16. Lemery F, "Beam Manipulation and Acceleration with Dielectric-lined Waveguides", PhD Thesis, Northern Ill. Univ. 2015.
17. Healy A L, Burt G, et al., "Design of a Dielectric-lined waveguide for Terahertz-driven Linear Electron Acceleration", Proc. LINAC2016, East Lansing, M I, 2016.
18. Barh A, Pal B P, Agrawal G P, Varshney R K, Rahman B M A, "Specialty Fibers for Terahertz Generation and Transmission: A Review", IEEE J. Selected Topics in Quantum Electronics, Vol 22, no 2, 2016, DOI 10.1109/JSTQE.2015.2494537.
19. Tuunanen et al, U.S. Pat. No. 6,130,385, Coaxial High-frequency Cable and Dielectric Material Thereof, 2000.
20. Doty F D, Doty G N, Staab J P, Sizyuk Y, and Ellis P D, "New Insights from Broadband Simulations into Small Overmoded Smooth and Corrugated Terahertz Waveguides and Transitions for NMR-DNP," J. Magn. Reson. Open, 2021.
21. Henry et al., U.S. Pat. No. 10,965,344, Methods and Apparatus for Exchanging Wireless Signals Utilizing Electromagnetic Waves Having Differing Characteristics, 2021.
22. Georgiadis V, Healy A L, Hibberd M T, et al., "Dispersion in dielectric-lined waveguides designed for terahertz-driven deflection of electron beams", Appl. Phys. Lett. 118, 144102 (2021)., DOI 10.1063/5.0041391.
23. Purea A, Reiter C, Dimitriadis A I, DeRijk E, Aussenac F, Sergeyev I, Rosay M, Engelke F, "Improved waveguide coupling for 1.3 mm MAS DNP probes at 263 GHz", J. Magn. Reson. 302 (2019) 43-49, doi:10.1016/j.jmr.2019.03.009.

The invention claimed is:

1. A waveguide for the transmission of radiation at nominal frequency $f_0$, comprising:

a laminate comprising a single copper layer bonded to a dielectric layer, said laminate formed into a guide tube with said copper layer on an outside of said guide tube and said dielectric layer on an inside of said guide tube, a support tube encasing said guide tube, said support tube further characterized as having a minimum inside diameter $d_i$ greater than $2\lambda$, where $\lambda$ is the free-space wavelength at said frequency $f_0$.

2. The waveguide of claim 1 in which said dielectric layer is further characterized as having thickness to greater than $\lambda_d/6$ and less than $\lambda_d/3$, where $\lambda_d$ is the wavelength in said dielectric layer at said frequency $f_0$.

3. The waveguide of claim 1 in which said dielectric layer has a tensile strength, and in which said dielectric layer is further characterized as having a dielectric loss tangent less than 0.003 at 30 GHz, a dielectric constant less than 3, and having an elastic modulus less than 100 times said tensile strength.

4. The waveguide of claim 1 in which said frequency $f_0$ is greater than 30 GHz and less than 3000 GHz.

5. The waveguide of claim 1 in which said guide tube has a first end and a second end, and in which said guide tube is further characterized as having a maximum inside diameter $d_1$ at said first end, a minimum inside diameter $d_2$ at said second end, and a taper angle $\theta$, said taper angle further characterized as being less than 10°, said diameter $d_2$ further characterized as being less than said diameter $d_1$ and greater than a diameter $d_1/2$.

6. The waveguide of claim 1 in which said guide tube has an inner surface, and in which said guide tube is further characterized as being of a work-hardenable alloy with said inner surface sanded and lubricated.

7. The waveguide of claim 1 wherein the dielectric layer is a low-loss dielectric.

8. The waveguide of claim 1 wherein the dielectric layer is substantially PTFE.

9. The waveguide of claim 1 in which said support tube is further characterized as comprising two semi-cylinder support tubes, each having a semi-cylindrical concave surface of radius suitable for encasing and supporting the guide tube, that together encase and support the guide tube.

10. The waveguide of claim 9 in which the two semi-cylinder support tubes each have a round outer profile or a square outer profile.

11. The waveguide of claim 1 in which said copper layer has thickness not less than 11 microns and not greater than 70 microns.

12. A method for use with a radiation at nominal frequency $f_0$, the method carried out by an apparatus comprising a laminate comprising a single copper layer bonded to a dielectric layer, said laminate formed into a guide tube with said copper layer on an outside of said guide tube and said dielectric layer on an inside of said guide tube, a support tube encasing said guide tube, said support tube further characterized as having a minimum inside diameter $d_i$ greater than $2\lambda$, where $\lambda$ is the free-space wavelength at said frequency $f_0$, the method comprising passing said radiation at the nominal frequency $f_0$ into a first end of said guide tube and making use of said radiation after said radiation is emitted from a second end of said guide tube.

13. The method of claim 12 wherein the dielectric layer is a low-loss dielectric.

14. The method of claim 12 wherein the dielectric layer is substantially PTFE.

15. A method for use with radiation at nominal frequency $f_0$, and with a laminate comprising a single copper layer bonded to a dielectric layer, the method comprising:

forming said laminate into a guide tube with said copper layer on an outside of said guide tube and said dielectric layer on an inside of said guide tube, and encasing said guide tube within a support tube;

said support tube characterized as having a minimum inside diameter $d_i$ greater than $2\lambda$, where $\lambda$ is the free-space wavelength at said frequency $f_0$.

16. The method of claim 15 wherein the dielectric layer is a low-loss dielectric.

17. The method of claim 15 wherein the dielectric layer is substantially PTFE.

18. The method of claim 15 further comprising the step of providing a lubricant between the guide tube and the support tube.

19. The method of claim 15 further comprising the step of sanding an inner surface of the guide tube.

* * * * *